US009197697B2

(12) United States Patent
Morton et al.

(10) Patent No.: US 9,197,697 B2
(45) Date of Patent: Nov. 24, 2015

(54) CLOUD COMPUTING SYSTEM AND METHOD

(71) Applicant: Gazoo, Inc., Bryan, TX (US)

(72) Inventors: Joseph Scott Morton, College Station, TX (US); Christopher Michael McDonald, Bryan, TX (US); Glenn Donald Knepp, College Station, TX (US)

(*) Notice: Subject to any disclaimer, the term of this patent is extended or adjusted under 35 U.S.C. 154(b) by 0 days.

(21) Appl. No.: 14/642,639

(22) Filed: Mar. 9, 2015

(65) Prior Publication Data

US 2015/0256609 A1 Sep. 10, 2015

Related U.S. Application Data

(60) Provisional application No. 61/950,289, filed on Mar. 10, 2014.

(51) Int. Cl.
*G06F 15/16* (2006.01)
*H04L 29/08* (2006.01)
*G06F 3/01* (2006.01)
*G06F 3/0481* (2013.01)
(Continued)

(52) U.S. Cl.
CPC ............... *H04L 67/10* (2013.01); *G06F 3/017* (2013.01); *G06F 3/0481* (2013.01); *H04L 29/08072* (2013.01); *H04L 65/60* (2013.01)

(58) Field of Classification Search
USPC .......... 709/201, 203, 217–218, 223–229, 250
See application file for complete search history.

(56) References Cited

U.S. PATENT DOCUMENTS 8,200,796 B1 6/2012 Margulis
2004/0056890 A1* 3/2004 Hao et al. ...................... 345/744
(Continued)

FOREIGN PATENT DOCUMENTS

CN 1220346 C 9/2005

OTHER PUBLICATIONS

Armstrong, "Amazon AppStream—Let the Cloud Do the Heavy Lifting", i Programmer, Publication [online]. Nov. 14, 2013 [retrieved May 19, 2015], Retrieved from the internet:<URL: http://www.i-programmer.info/news/141-cloud-computing/6604-amazon-appstream.html>; pp. 1-3.

(Continued)

*Primary Examiner* — Zarni Maung
(74) *Attorney, Agent, or Firm* — Kevin M. Klughart; Carstens & Cahoon, LLP

(57) ABSTRACT

A system and method deploying cloud computing software applications and resources to mobile devices is disclosed. The system/method virtualizes the graphical user experience (GEX) and user input experience (UEX) that comprise the graphical user interface (GUI) for host application software (HAS) running on a host computer system (HCS). The virtualized GUI (VUI) GEX component is converted to a remote video stream (RVS) and communicated to a remote mobile computing device (MCD) over a computer communication network (CCN). A MCD thin client application (TCA) receives the RVS and presents this GEX content on the MCD display using a graphics experience mapper (GEM). A TCA user experience mapper (UEM) translates MCD user inputs to a form suitable for UEX protocols and communicates this user input over the CCN to the HCS for translation by the UEX into HCS operating system protocols compatible with the HAS.

30 Claims, 12 Drawing Sheets

(51) Int. Cl.
*H04L 29/06* (2006.01)
*G06F 12/00* (2006.01)

(56) References Cited

U.S. PATENT DOCUMENTS

| | | |
|---|---|---|
| 2006/0013390 A1 | 1/2006 | Herz et al. |
| 2008/0056671 A1 | 3/2008 | Kamijo et al. |
| 2008/0263361 A1 | 10/2008 | Dutta et al. |
| 2010/0313226 A1 | 12/2010 | Cholas et al. |
| 2011/0093822 A1 | 4/2011 | Sherwani |
| 2011/0208837 A1 | 8/2011 | Sartori |
| 2011/0296179 A1 | 12/2011 | Templin et al. |
| 2011/0314356 A1 | 12/2011 | Grube et al. |
| 2012/0076197 A1 | 3/2012 | Byford et al. |
| 2012/0084381 A1* | 4/2012 | Alladi et al. ............... 709/213 |
| 2012/0149476 A1 | 6/2012 | Perlman et al. |
| 2012/0254450 A1 | 10/2012 | Lejeune et al. |
| 2013/0013828 A1 | 1/2013 | Pang et al. |
| 2013/0239134 A1 | 9/2013 | Lajoie et al. |
| 2013/0268775 A1 | 10/2013 | Hawkins |
| 2013/0279877 A1 | 10/2013 | Boak |
| 2013/0291006 A1 | 10/2013 | Tam |
| 2013/0311768 A1 | 11/2013 | Fosmark et al. |
| 2013/0346079 A1* | 12/2013 | Miglietta et al. .............. 704/235 |
| 2014/0052770 A1 | 2/2014 | Gran et al. |
| 2014/0177633 A1* | 6/2014 | Manula et al. ................ 370/392 |
| 2014/0214446 A1* | 7/2014 | Nusbaum et al. ................ 705/2 |
| 2014/0245339 A1 | 8/2014 | Zhang et al. |
| 2014/0282032 A1* | 9/2014 | Brown et al. ................ 715/738 |
| 2014/0372754 A1 | 12/2014 | Aissi et al. |

OTHER PUBLICATIONS

The International Search Report and the Written Opinion of the International Searching Authority for International Application No. PCT/US2015/019729.

* cited by examiner

CLOUD COMPUTING SYSTEM AND METHOD

CROSS REFERENCE TO RELATED APPLICATIONS

U.S. Provisional Patent Applications

This application claims benefit under 35 U.S.C. §119 and incorporates by reference U.S. Provisional patent application for CLOUD COMPUTING SYSTEM AND METHOD by inventors Joseph Scott Morton, Christopher Michael McDonald, and Glenn Donald Knepp, filed electronically with the USPTO on Mar. 10, 2014, with Ser. No. 61/950,289, EFS ID 18414620, confirmation number 2283.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to cloud computing systems and methods for deploying host computer system (HCS) software applications to a mobile computing device (MCD). More specifically and without limitation the present invention permits virtualizing enterprise-class software applications to MCD environments via the use of a thin-client MCD software application in contexts where the computer communication network (CCN) linking the HCS and MCD is of low bandwidth and/or the MCD is of limited processing power.

PRIOR ART AND BACKGROUND OF THE INVENTION

Prior Art

The deployment of cloud computing services typically involves the presentation of host application software (HAS) by a host computer system (HCS) to a remote computing device (RCD) which may be in some circumstances a mobile computing device (MCD) such as a computer tablet or smartphone. The deployment of software applications to the RCD/MCD platform can be problematic for several reasons including:

The MCD may have insufficient resources to run the HAS.
The MCD may have insufficient processing power to run the HAS.
The MCD may have insufficient communication bandwidth to provide responsive access to the HAS.
The MCD may not have hardware compatible with the HCS operating environment (missing keyboard, mouse, or other user input device).

All of these issues may result in a poor user experience with the HCS/HAS combination and in many circumstances prevent the HAS from being capable of deployment in a MCD environment.

The typical approaches to HAS deployment to remote computing devices includes the use of a web browser interface on the HCS as an access portal to the HAS or the use of a virtual private network (VPN) that links the MCD to the HCS over a secure network interface. Both of these approaches suffer from significant performance limitations in that they require a large communication overhead between the HCS and MCD to maintain a real-time view of the display screen that is simulated by the HCS for the purposes of providing a virtualized display for the HAS. MCDs having limited processing power or limited communication bandwidth to the HCS suffer in these circumstances because these limitations result in poor application responsiveness and a resulting poor user experience.

Additionally, the large communication overhead associated with VPN methodologies (especially in situations where the video display experiences a high rate of change or where user input such as keyboard or mouse input is common) results in higher communication costs for MCDs using this form of interface. High frame rate updates by a typical VPN remote console simulator often result in very high communication link bandwidth utilization between the HCS and MCD and cannot be supported in situations where the communication link bandwidth is limited. All of these drawbacks may be cost/performance prohibitive in situations where the end user has limited financial and hardware means.

Deficiencies in the Prior Art

The prior art as detailed above suffers from the following deficiencies:
Prior art cloud computing systems and methods typically require a minimum CCN bandwidth to virtualize the HSC environment on the mobile device.
Prior art cloud computing systems and methods typically lack responsiveness in situations where the CCN bandwidth is limited.
Prior art cloud computing systems and methods typically consume considerable CCN bandwidth in virtualizing the HSC environment to the mobile device.
Prior art cloud computing systems and methods typically lack responsiveness in situations where the MCD processing power is limited.
Prior art cloud computing systems and methods typically require significant software application development to occur on the MCD to support the virtualized HCS environment.
Prior art cloud computing systems and methods typically have difficulty in maintaining security for virtualized HCS environments supported by MCD hardware.
Prior art cloud computing systems and methods require the use of a virtual private network (VPN) to maintain security between the HCS and MCD.

Prior art cloud computing systems and methods typically have difficulty in porting the visual content of the HSC application to the MCD display environment.

While some of the prior art may teach some solutions to several of these problems, the core deficiencies in the prior art systems have not been addressed.

OBJECTIVES OF THE INVENTION

Accordingly, the objectives of the present invention are (among others) to circumvent the deficiencies in the prior art and affect the following objectives:
 (1) Provide for a cloud computing system and method that requires minimum CCN bandwidth to virtualize the HSC environment on the mobile device.
 (2) Provide for a cloud computing system and method that provides user responsiveness in situations where the CCN bandwidth is limited.
 (3) Provide for a cloud computing system and method that consume minimal CCN bandwidth in virtualizing the HSC environment to the mobile device.
 (4) Provide for a cloud computing system and method that is responsive in situations where the MCD processing power is limited.
 (5) Provide for a cloud computing system and method that requires minimum software application development to occur on the MCD to support the virtualized HCS environment.
 (6) Provide for a cloud computing system and method that maintains security for virtualized HCS environments supported by MCD hardware.
 (7) Provide for a cloud computing system and method that does not require the use of a virtual private network (VPN) to maintain security between the HCS and MCD.
 (8) Provide for a cloud computing system and method that seamlessly ports the visual content of the HSC application to the MCD display environment.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The present invention supports the deployment of cloud computing host software applications (HAS) and content to a mobile computing device (MCD) from a host computer system (HCS) over a computer communication network (CCN). In an exemplary invention system embodiment the HCS is configured with conventional host operating system software (HOS) that supports execution of the HAS. This HOS is equipped with a virtualized graphical user interface (VUI) device driver that is configured to virtualize the graphical user experience (GEX) and user input experience (UEX) associated with the HAS as it is executed on the HCS. The VUI permits the HAS to operate transparently on the HCS and appear as if it is operating in a standalone computer environment.

The VUI is configured to translate the GEX into a remote video stream (RVS). This RVS may be contained in one or more compressed video formats to minimize the effective bandwidth of transmitting this application display image. The HCS is configured to transmit the RVS to the MCD over the CCN. The MCD further comprises a thin client application (TCA) that implements a graphics experience mapper (GEM) and user experience mapper (UEM). The GEM is configured to receive the RVS and present the RVS to a display on the MCD. Simultaneously, the UEM is configured to accept user input data (UID) entered on the MCD and translate the UID to an equivalent UEX protocol. This equivalent UEX protocol is then transmitted by the TCA to the VUI for presentation to the HAS through the HCS. In this manner, the user input capabilities of the MCD are mapped to equivalent UEX protocols that are understood by the HAS.

By utilizing streamed video rather than transmitting display images frame-by-frame from the HCS to the MCD, the bandwidth requirements for hosting the HAS on the MCD are drastically reduced, as the HCS can implement the HAS locally and merely provide a thin-client audio/video/keyboard/mouse interface to the MCD via translation services performed by the VUI(GEX,UEX) and TCA (GEM,UEM).

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

Figure 1:
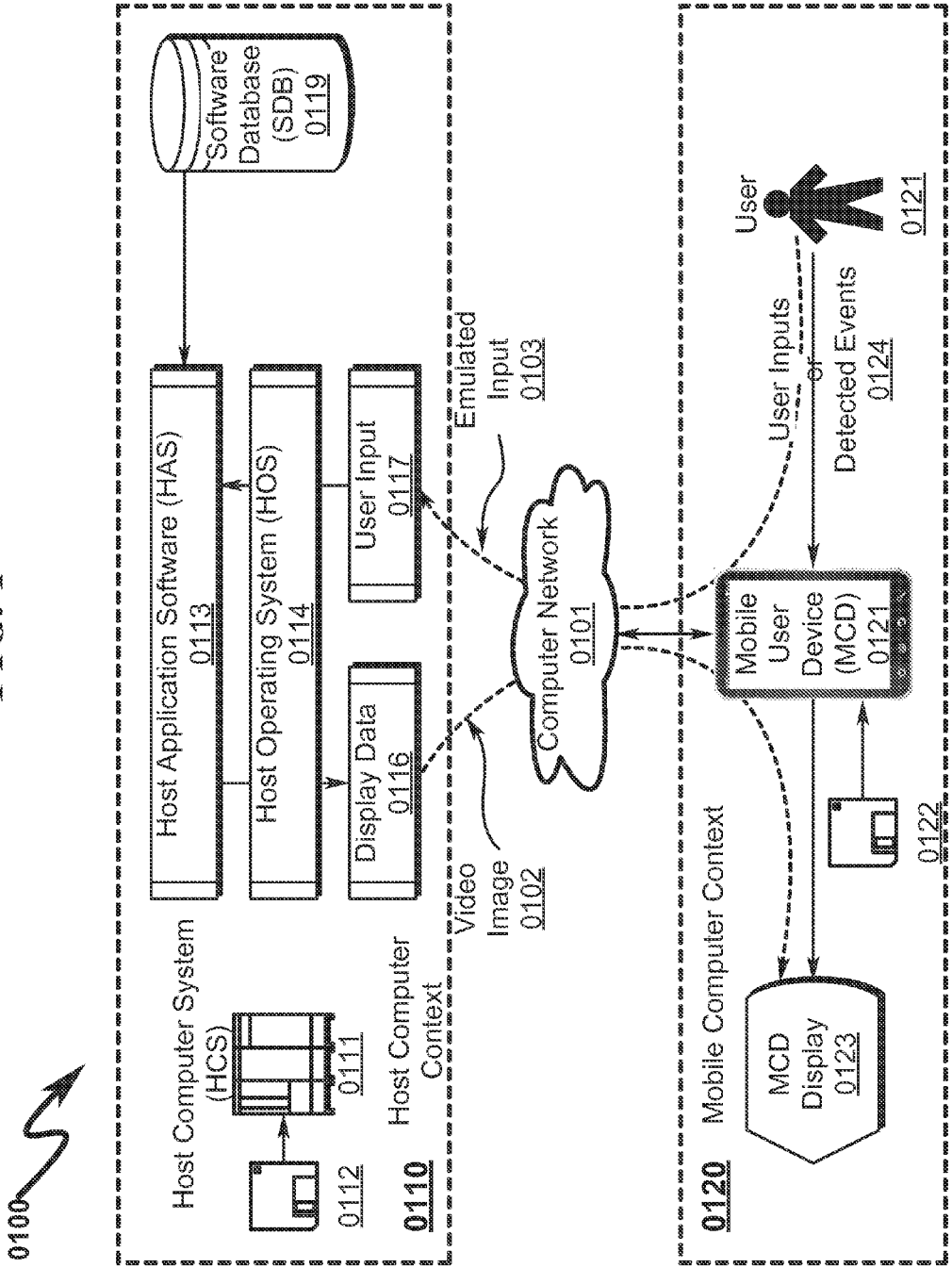
FIG. 1 illustrates an overview block diagram depicting a preferred exemplary invention system embodiment.

While this invention is susceptible of embodiment in many different forms, there is shown in the drawings and will herein be described in detailed preferred embodiments of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a CLOUD COMPUTING SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Remote Video Stream not Limitive

The present invention anticipates that a wide variety of remote video streaming formats may be used to implement the video streaming component of the present invention. Without limitation, the RVS may include audio and/or video formats including but not limited to: MPEG; MPEG-2; MPEG-4; H.264; THEORA; WEBM; DIRAC; REALVIDEO; VP8; and HEVC.

Host Computer System HOS not Limitive

The present invention anticipates that a wide variety of host computer system and host operating system software (HOS) may be used to implement the present invention. Without limitation, the HOS may include MICROSOFT® WINDOWS®; MAC®; and LINUX® operating system products.

General Concept

The present invention has as a general objective to use cloud technologies to deliver the latest software solutions to any Internet enabled devices. The disclosed invention provides a complete desktop experience to mobile computing devices (MCDs) such as inexpensive pen and touch devices. Various invention embodiments, for example, would permit any WINDOWS®, MAC®, or LINUX® software application running on a host computer to effectively operate on a $50 ANDROID® tablet.

The present invention operates to lower the effective cost of deploying cloud computing solutions. The present invention leverages cloud computing to put the power of an expensive laptop into the hands of individuals unable to afford the tools necessary to support traditional cloud computing resources. The present invention allows for an individual in any underdeveloped nation with a cellphone Internet connection and inexpensive tablet computer to have the same software tools available to any person in a developed nation.

This objective is achieved by changing the way in which software is deployed to mobile devices. Rather than executing host software applications (HASs) on the mobile computing device (MCD), these applications are executed on cloud host computer systems (HCSs). The presentation displays for these HASs operating on the HCSs are then streamed as video to the MCD. This allows the HSC to perform the heavy processing associated with the HAS and simultaneously minimize the communication bandwidth necessary to support a virtualized display to the MCD. User input from the MCD is translated into native HCS user input protocols and transparently entered into the HAS.

This approach to distributing HASs on MCDs has several advantages, including:

- Remote users need only support inexpensive MCD hardware to have access to powerful HASs resident on the HCS.
- HAS software can be automatically updated in a central HCS rather than require deployment to a plethora of remote MCDs.
- HAS software licensing can be leveraged to only support the maximum number of ACTIVE MCDs rather than licenses to all EXISTING MCDs.
- Software licensing fees associated with virtual operating systems and virtualized desktops are eliminated.
- The remote MCD need not have extensive hardware capability, just the capability of displaying video. All processing, memory, and storage requirements are provided by the HCS.
- The user experience on the MCD directly maps that which would be experienced on a local HCS.
- The processing and communications overhead associated with virtual desktops is eliminated (no 30 Hz/60 Hz refresh overhead associated with many virtualized desktops).
- User files are stored on the HCS and are not lost if the MCD is damaged, lost, or stolen.

One skilled in the art will recognize that this list is only exemplary and non-exhaustive.

System Overview (0100)

The general invention concept may be better understood by inspecting the system overview block diagram depicted in FIG. 1 (0100). In this exemplary system embodiment, a host computing context (0110) is connected with a mobile computing context (0120) via the use of a computer communication network (CCN) (0101). In each context (0110, 0120) there are corresponding computing devices such as a host computer system (0111) and mobile computing device (0121) each executing machine instructions read from computer readable media (0112, 0122).

Within the host computer context (0110), host application software (0113) is retrieved from a software database (SDB) (0119) and typically run under control of a host operating system (HOS) (0114) executed within the context of the host computer system (HCS) (0111). This HAS (0123) has both display (0116) and user input (0117) interfaces to the HOS (0114).

The present invention translates the display data (0116) component of the HAS (0113) output to a video stream (0102) that is communicated over the CCN (0101) to the MCD display (0123) under control of a thin client application running on the MCD (0121). The advantage of this approach to cloud computing application deployment is the ability to minimize the hardware needed on the MCD (0121) to run a software application and also minimize the CCN (0101) network bandwidth necessary to support the application remotely. By converting the display data (0116) to streaming video, the use of advanced video compression technologies can be used to reduce the necessary bandwidth to support the MCD video display (0123) of the HAS (0113) display content (0115).

The HAS (0113) user input (0117) is handled by the MCD (0121) via the use of user inputs (0124) received on the MCD (0121) and relayed via the CCN (0101) to the user input (0117) portion of the HOS (0114) running on the HCS (0111). The MCD user input (0124) is then passed through an emulator (0103) to convert MCD user input (0124) into user input information (0117) compatible with both the HOS (0114) and the HAS (0113).

Note that this approach to application deployment is also efficient with respect to software installation and maintenance in that the SDB (0119) may serve as a central repository for all software to be deployed to a plethora of remotely connected MCD (0121) systems. Additionally licensing for the software contained in the SDB (0119) may be purchased base on simultaneous use rather than on a per-MCD installation basis, thus reducing the overall cost of deploying software to MCDs that may not necessarily make simultaneous use of the software.

Method Overview (0200)

Figure 2:
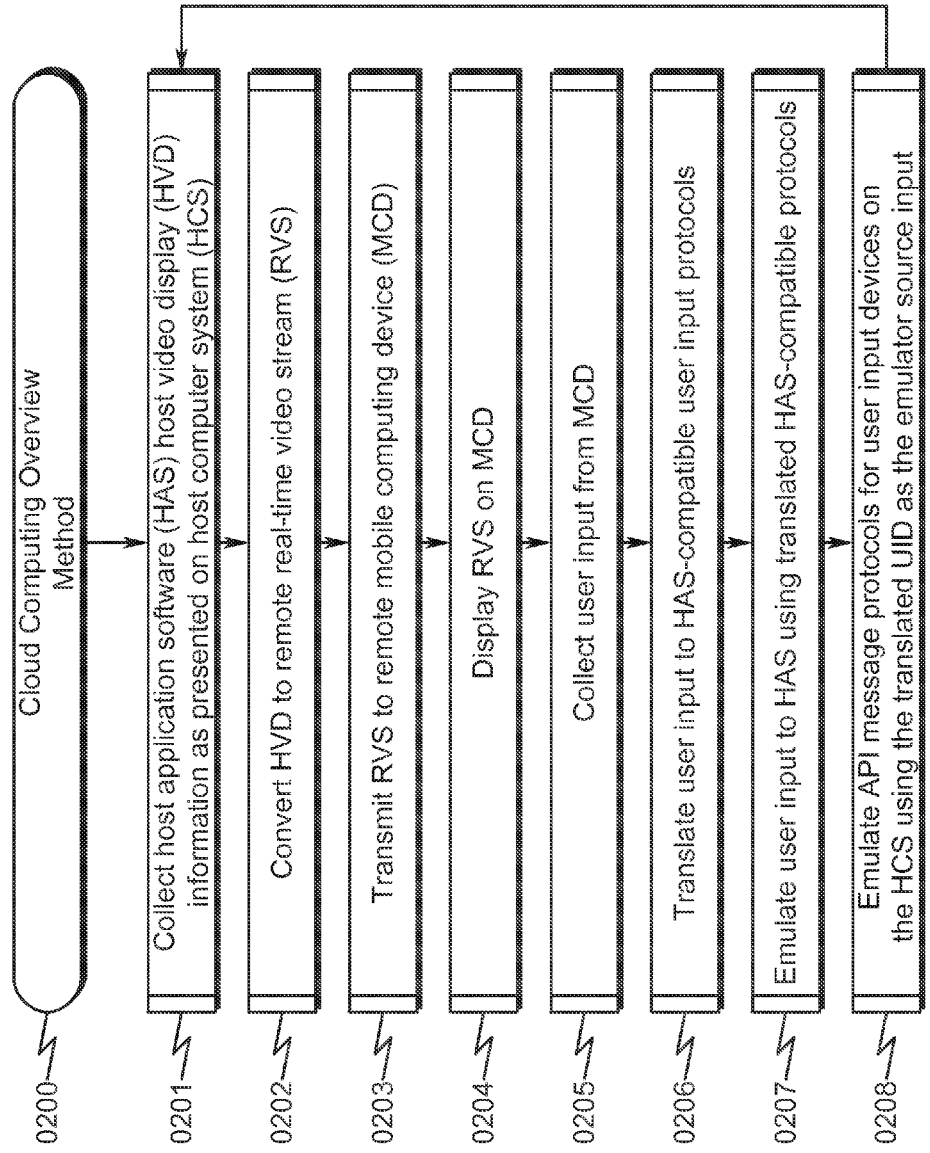
FIG. 2 illustrates an overview flowchart depicting a preferred exemplary invention method embodiment.

An exemplary present invention method can be generally described in the flowchart of FIG. 2 (0200) as incorporating the following steps:
(1) Collecting host application software (HAS) host video display (HVD) information as presented on host computer system (HCS) (0201);
(2) Converting the HVD data to a remote real-time video stream (RVS) (0202);
(3) Transmitting the RVS to a remote mobile computing device (MCD) over a computer communication network (CCN) (0203);
(4) Display the RVS on the MCD display screen (0204);
(5) Collecting user input from the MCD (0205);
(6) Translating the MCD user input to a HAS-compatible user input protocol (0206);
(7) Emulating the MCD user input to the HAS using translated HAS-compatible user input protocols (0207); and
(8) Emulating API message protocols for user input devices on the HCS using the translated UID as the emulator source input (0208).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

System Detail Overview (0300)

Figure 3:
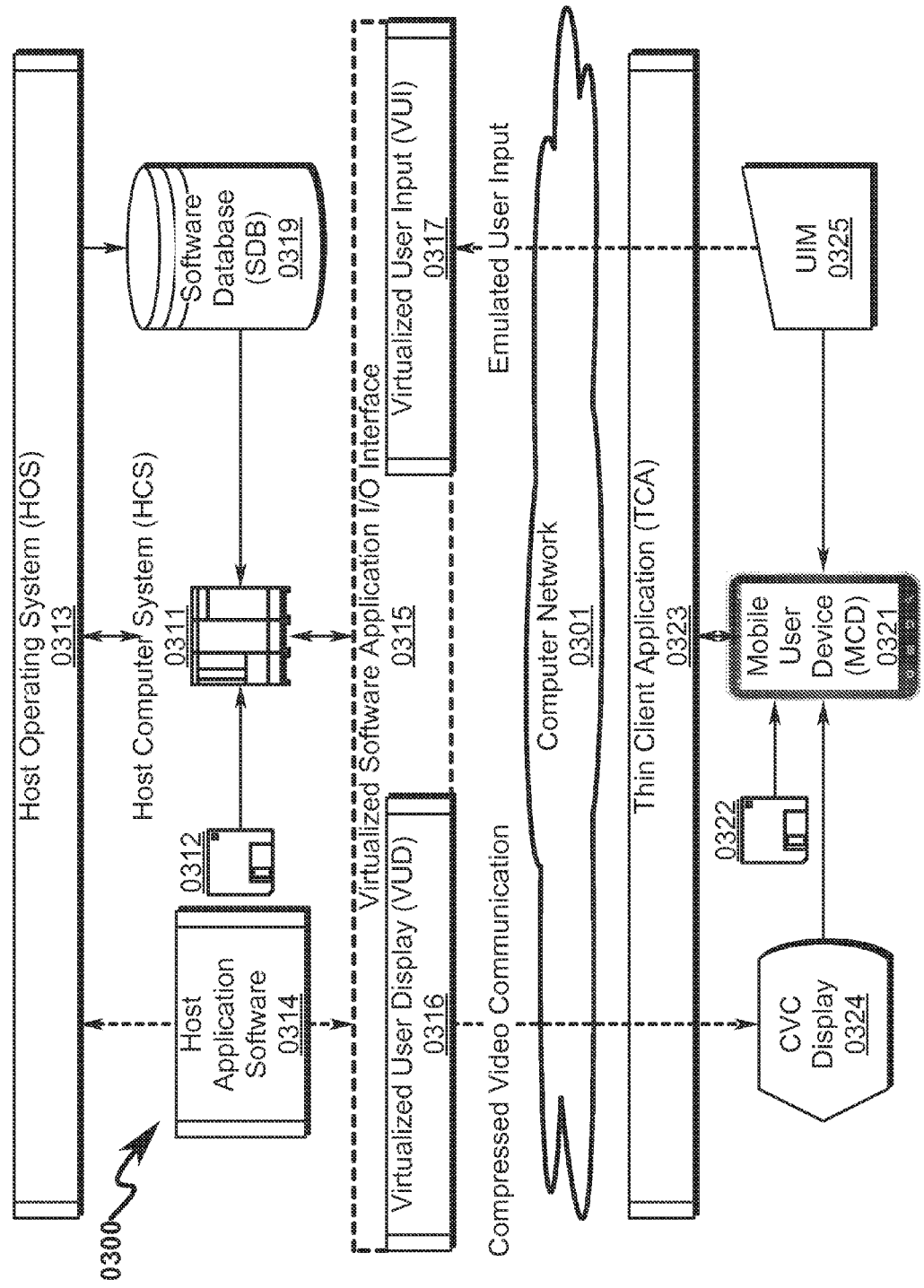
FIG. 3 illustrates a detail block diagram depicting a preferred exemplary invention system embodiment.

Additional detail regarding operation of a preferred invention embodiment may be found by inspecting the block diagram depicted in FIG. 3 (0300). In this exemplary system embodiment the host computer system (HCS) (0311) executing software read from a computer readable medium (0312) operates under control of a host operating system (HOS) (0313) to retrieve and execute application software (0314) from a software database (0319). This application software (0315) as it operates under control of the HOS (0313) interacts with a virtualized software application I/O interface (0315) that mimics the hardware interfaces associated with a normal display monitor and keyboard/mouse input via the use of virtualized user display (VUD) (0316) and virtualized user input (VUI) (0317) device driver modules.

The VUI device driver (0316) is responsible for converting standard GUI display commands (such as window displays, character output, graphic output, and the liked) into a compressed video communication (CVC) video stream that is transmitted over a communication network (0301) to mobile user device (MCD) (0321) executing software read from a computer readable medium (0322) and implementing a thin client application (TCA) (0323) responsible for mimicking a HCS (0311) user experience within the context of the MCD (0321). The TCA (0323) comprises a CVC display (0324) component responsible for converting the VUD (0315) output to the display of the MCD (0321). The use of CVC communication between the HCS (0311) and MCD (0321) may in some embodiments permit standard MPEG or other video decoders to be used in this display capacity.

Integration of user input to the HAS (0314) is accomplished by use of a user input module (0325) component that operates with the TCA (0323) to collect a variety of user input (e.g., keypad entries, hand gestures, simulated mouse gestures, etc.) from the MCD (0321) and translate these to compatible user inputs for the VUI (0317) that are then translated to appropriate HOS (0313) inputs and passed to the HAS (0314) for processing by the application software.

Method Detail Overview (0400)

Figure 4:
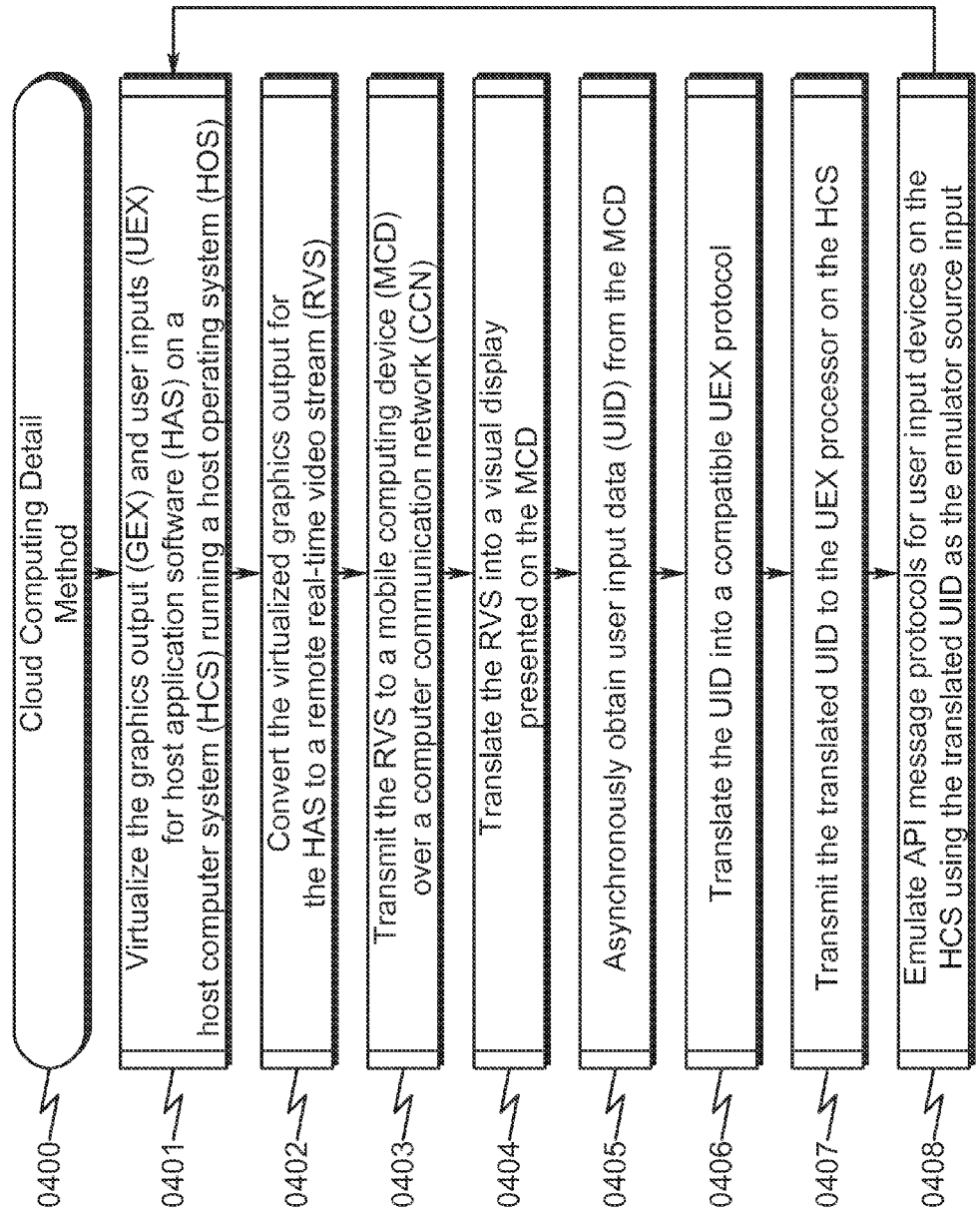
FIG. 4 illustrates a detail flowchart depicting a preferred exemplary invention method embodiment.

An exemplary present invention detailed method can be generally described in the flowchart of FIG. 4 (0400) as incorporating the following steps:
(1) Virtualizing the graphics output (GEX) and user inputs (UEX) for host application software (HAS) on a host computer system (HCS) running a host operating system (HOS) (0401);
(2) Converting the virtualized graphics output for the HAS to a remote real-time video stream (RVS) (0402);
(3) Transmitting the RVS to a mobile communication device (MCD) over a computer communication network (CCN) (0403);
(4) Translating the RVS into a visual display presented on the MCD (0404);
(5) Asynchronously obtaining user input data (UID) from the MCD (0405);
(6) Translating the UID into a compatible UEX protocol (0406);
(7) Transmitting the translated UID to the UEX processor on the HCS (0407); and
(8) Emulating API message protocols for user input devices on the HCS using the translated UID as the emulator source input (0408).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

TCA Modules (0500)

Figure 5:
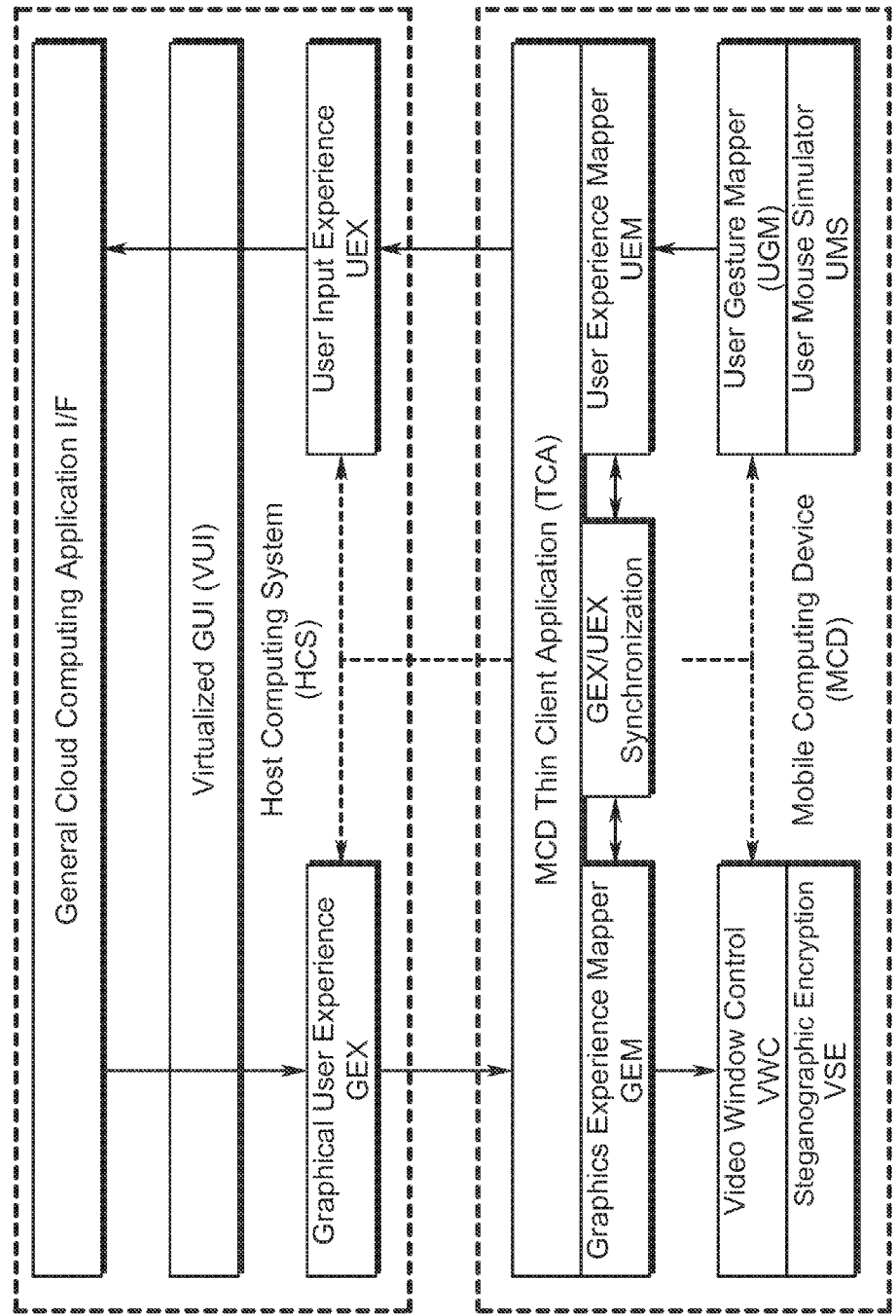
FIG. 5 illustrates a variety of exemplary TCA components that may operate in various embodiments of the present invention.

The MCD TCA may incorporate a number of subfunction modules as depicted generally in FIG. 5 (0500). These modules may include but are not limited to any of the following:
Graphics Experience Mapper (GEM). Generally responsible for receiving the video stream from the GEX component of the VUI virtualizer and presenting this visual information to the MCD display.
User Experience Mapper (UEM). Generally responsible for receiving keyboard/mouse/tablet user input entered on the MCD and translating this information into a standardized format that is interpreted by the UEX component of the VUI virtualizer.
Video Window Control (VWC). Generally responsible for setting the viewport into the virtualized video stream presented on the MCD. Since the MCD may have a smaller screen size than that supported by the HCS, the VWC permits the MCD user to zoom/pan across a wider display space to achieve a readable screen.

Steganographic Encryption (VSE). This TCA component may be used to interpret steganography information embedded within the video stream to support secure data communication between the HCS and MCD. Note that since this information is interpreted in view of the compressed video image, tapping the communication link between the HCS and MCD will be ineffective in interpreting this information.

User Gesture Mapper (UGM). This TCA component maps user gestures or other user inputs associated with the MCD to user-defined or pre-defined actions by the UEX virtualization component of the VUI. Note that this component may inspect information associated with a touch screen on the MCD but may also include captured video, captured audio, or other user inputs that are not formally associated with a keyboard and/or mouse/trackball/touchpad.

User Mouse Simulator (UMS). This TCA component simulates the functionality of a mouse/trackball/touchpad to support cursor displays and input associated with these types of devices. In many circumstances this component may comprise advanced features to minimize the communication bandwidth required by the CCN to support the HCS/MCD connection. For example, the UMS may incorporate mouse trajectory tracking to determine the arcuate trajectory of a local mouse movement and translate this to trajectory curve information that is transmitted to the UEX rather than streaming individual pixel locations to the UEX interface. This can dramatically reduce the bandwidth required by the CCN to support the remote application context of the HCS.

GEX/UEX Synchronization. This TCA component is responsible for ensuring that the GEM/UEM modules are properly synchronized with the GEX/UEX interfaces operating on the HCS. Because the CCN may operate in a variety of degraded modes, the HCS/MCD communication may become unstable or disconnected due to intermittent CCN failure. The GEX/UEX synchronization module ensures that the GEM and UEM correspond to a consistent state of the GEX/UEX VUI virtualization context.

One skilled in the art will recognize that this list of TCA features is illustrative and not limitive of the present invention.

Steganograohic Encryption (0600)

Figure 6:
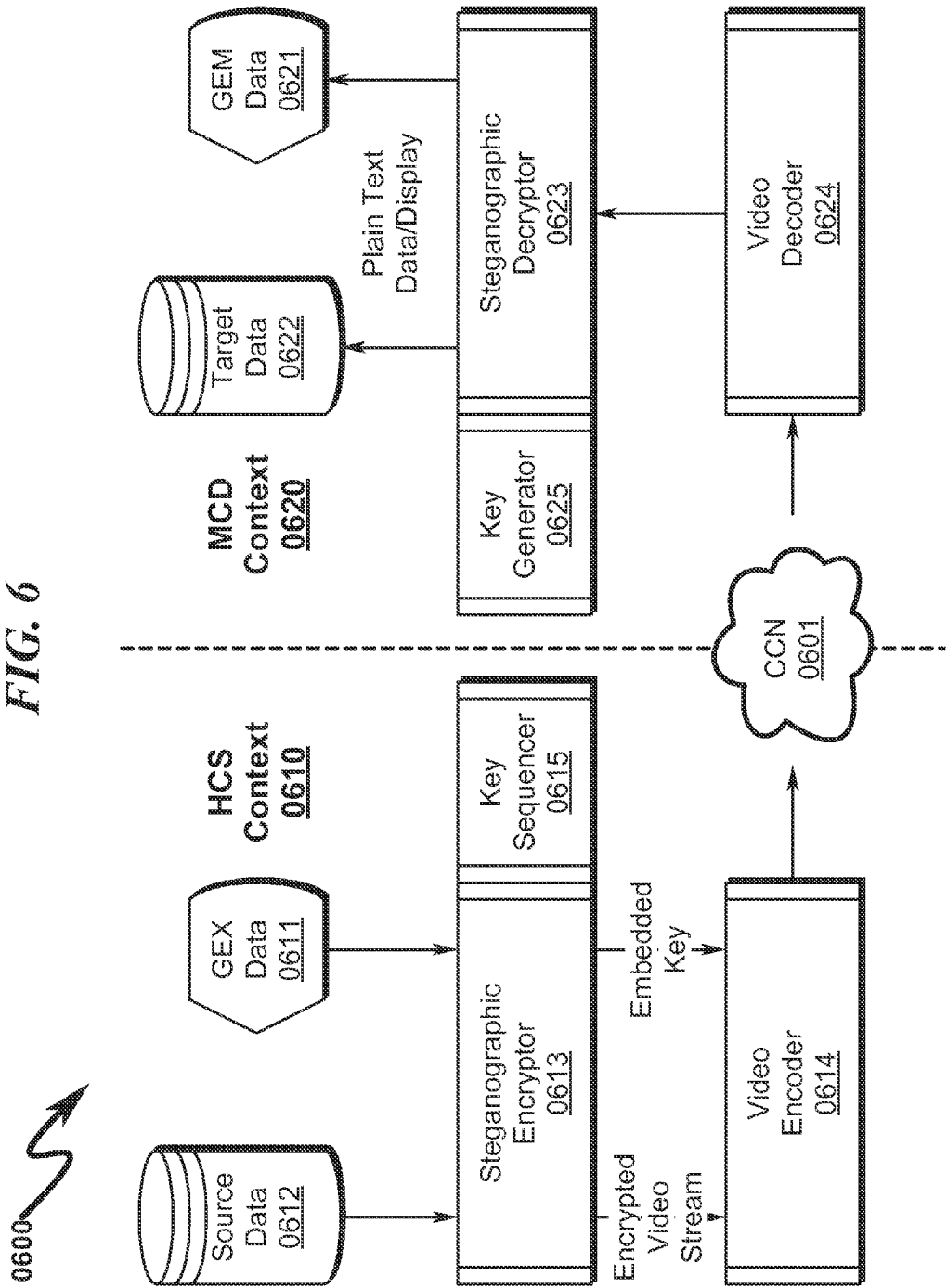
FIG. 6 illustrates the use of steganographic data encapsulation within the video stream transmitted to the MCD.

As depicted in FIG. 6 (0600), the present invention anticipates that some preferred embodiments may incorporate steganographic encryption within the video stream transmitted between the HCS and MCD. This use of steganographic encryption may form the basis for a secure web browser interface that provides an added layer of security on top of that provided by conventional web browser services.

Steganography is the art or practice of concealing a message, image, or file within another message, image, or file. The advantage of steganography over cryptography alone is that the intended secret message does not attract attention to itself as an object of scrutiny. Plainly visible encrypted messages—no matter how unbreakable—will arouse interest, and may in themselves be incriminating in countries where encryption is illegal. Thus, whereas cryptography is the practice of protecting the contents of a message alone, steganography is concerned with concealing the fact that a secret message is being sent, as well as concealing the contents of the message.

Steganography includes the concealment of information within computer files. In digital steganography, electronic communications may include steganographic coding inside of a transport layer, such as a document file, image file, program or protocol. Media files are ideal for steganographic transmission because of their large size. For example, a sender might start with an innocuous image file and adjust the color of every 100th pixel to correspond to a letter in the alphabet, a change so subtle that someone not specifically looking for it is unlikely to notice it.

The present invention anticipates the use of steganography in conjunction with encryption to permit the merging of both GEX display data (0611) and source data files (0612) within an encryption process (0613) operating in the HCS context (0610) to form a merged video data stream comprising both an encrypted video stream as well as an optional embedded key. This merged video information is then input to a video encoder (e.g., MPEG encoder) and transmitted via the CCN (0601) to a video decoder (0624) operating in the MCD context (0620). The video decoder (0624) regenerates the video stream and this video stream is then run through a steganographic decryption process (0623) that extracts the GEM display data (0621) and optional target data (0622). The fact that the video encoder (0614) and video decoder (0624) may implement lossy compression/decompression may be used in this process to hide the encryption keys associated with the data transfer and make the decryption of the combined source data and GEX display even more difficult for attacks that rely on tapping the CCN communication link.

Within this context a key generator (0625) may be populated by MCD user inputs from the UEM or GEM modules and be used to populate a key sequencer (0615) that is the basis of the original encryption process (0613). It is significant to note that this process is capable of supporting a number of secure data subchannels within the video stream and thus simultaneously support a number of GEX/GEM displays (0611, 0621) and/or source/target databases (0612, 0622).

UEX/UEM Translation/Mapping (0700)

Overview

The present invention anticipates that there may be a physical disconnect between the hardware provided by the MCD and that associated with the host application software (HAS). For example, the HAS may be configured to run in a personal computer (PC) environment and expect the availability of a conventional QWERTY keyboard and mouse/trackball/touchpad as standard user input devices, whereas the MCD may not support a keyboard or mouse but only a touchscreen display. The present invention permits the MCD to provide input to the HAS by means of a combination of a user experience mapper (UEM) and user input experience translator (UEX).

Exemplary Tablet Computer Mapping

Figure 7:
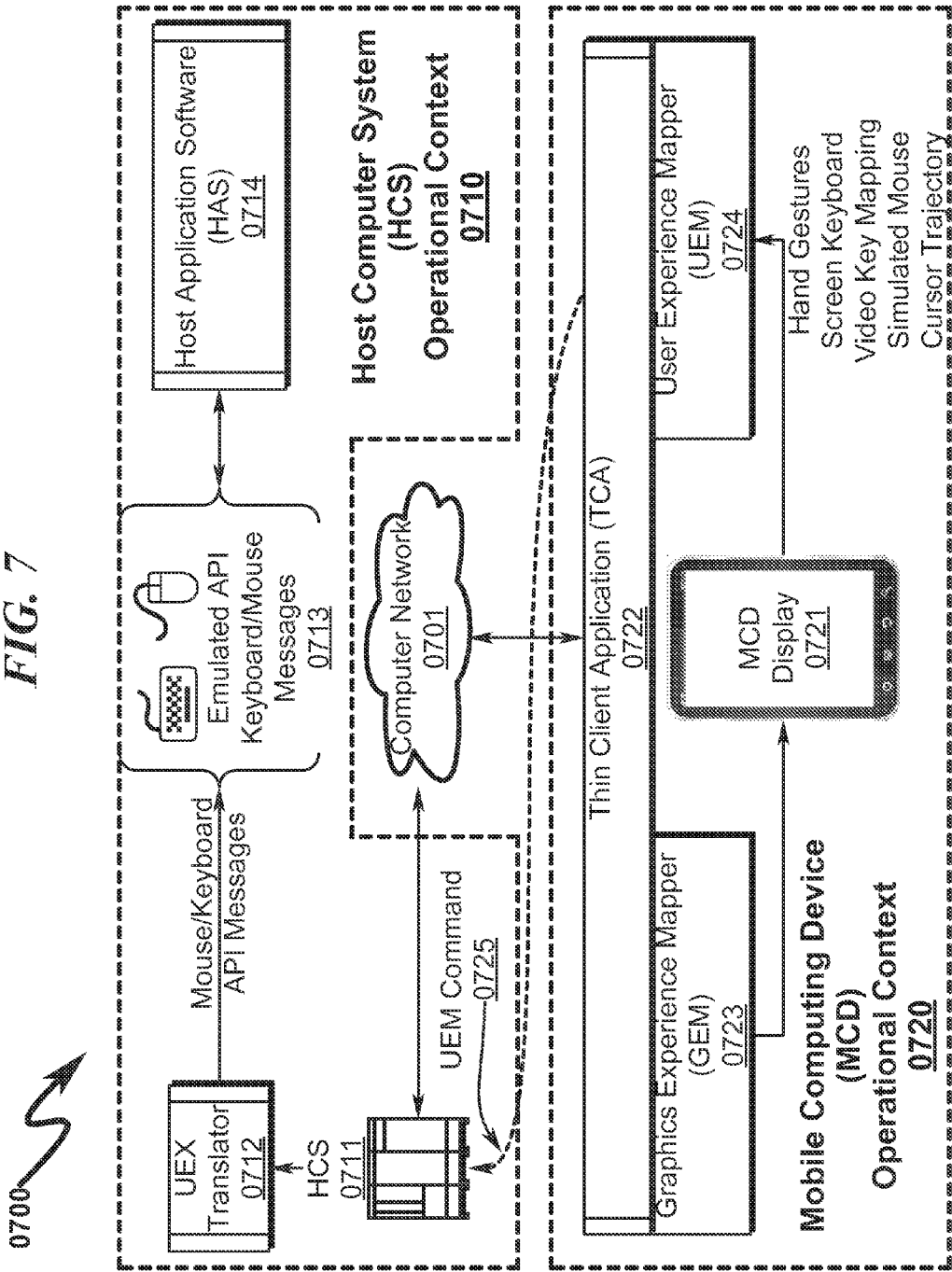
FIG. 7 illustrates an exemplary invention embodiment data flow diagram depicting user experience mapper (UEM) coordination on the MCD with user input experience translation (UEX) on the HCS.

An example of this situation is depicted in FIG. 7 (0700), wherein the HCS context (0710) and MCD operational context (0720) are linked via a computer communication network (CCN) (0701). Within this context the MCD display (0721) is linked to the HCS operational context (0710) via a thin client application (TCA) (0722) that controls both a graphics experience manager (0723) responsible for presentation of information on the MCD display (0721) and a user experience mapper (0724) responsible for gathering user inputs to the MCD and presenting them properly to the HCS context (0710).

The MCD operational context (0720) and specifically the MCD display (0721) are scanned for a variety of user input function types, such as hand gestures, simulated keyboard screen inputs, screen touches corresponding to mapped regions of video, a simulated mouse input and/or movement (including mouse clicks and button activations), and cursor trajectory information. This information is packetized by the user experience mapper (UEM) (0724) in a standardized application-agnostic format and sent as a UEM command (0725) by the TCA (0722) via the CCN (0701) to the HCS (0711). The HCS (0711) relays the UEM command (0725) to the UEX translator (0712) that translates the generic UEM command (0725) into an operating system specific emulated API message (0713) that is then relayed via internal operating system message queues to the host application software (HAS) (0714).

Exemplary Man Functions

While a wide variety of UEM functions are anticipated as within the scope of the present invention, several are preferred and listed below:
  Hand Gestures. Hand gestures may be mapped to a variety of function keys. For example, "swiping" an application screen image may map to an "ALT-TAB" WINDOWS® keyboard message that would translate into a "display next active application window" message being processed by the HCS (0711) and associated operating system software. As depicted in this example, UEM (0724) operation may include the mapping of HAS (0714) keys that include operating system functionality.
  Screen Keyboard Emulation. A keyboard (possibly including a QWERTY keyboard or some other form of simulated keyboard) may be displayed on the MCD (0721) and keys mapped to this display used as the encoding of the UEM mapping (0724) and/or UEM command (0725).
  Video Key Mapping. Areas of the MCD display (0721) that are either related to or disconnected from the HAS (0714) may be identified within the UEM (0724) and trigger one or more equivalent characters to be transmitted to the HAS (0714) as an emulated API message (0713). Note that since the MCD display (0721) is mapped using a video image rather than a rasterized image as normally presented by the HAS (0714), the UEM (0724) must coordinate with the GEM (0723) to enable the translation from video to raster coordinates.
  Simulated Mouse. The UEM (0724) may incorporate logic to simulate a computer mouse (including display cursor or other visual indicia) as well as key/button input and scrolling inputs normally associated with computer mouse functionality.
  Cursor Trajectory. In conjunction with the mouse simulation detailed above, the UEM (0724) may incorporate "cursor trajectory" that locally simulates the movement of the mouse cursor on the display but only transmit trajectory information on the mouse movement to the UEX translator (0712) to minimize the data traffic through the CCN (0701).
One skilled in the art will realize that this list is illustrative and does not limit the invention scope.

Exemplary Embodiment

AMAZON® Web Services (0800)

Background

The present invention may also be applied in the context of AMAZON® Web Services (AWS) infrastructure. AMAZON® AppStream's STX Protocol manages streaming a computer application from AMAZON® Web Services (AWS) to local client devices. It monitors network conditions and automatically adapts the video stream to provide a low latency and high-resolution experience to users. It minimizes latency while synchronizing audio and video as well as interactively capturing input from users to be sent back to the application running in AWS.

AMAZON® AppStream deploys streaming-enabled applications on an AMAZON® EC2 instance. A streaming application can be added through the AWS Management Console, where the service creates an AMAZON® Machine Image (AMI) required to host the application and makes the application available to devices running streaming clients. The service scales the application as needed within the capacity limits that have been set to meet demand.

The AMAZON® team developed an AppStream software development kit (SDK) for integrating streaming applications into AMAZON®'s Web Services. AMAZON®'s AppStream SDK simplifies the development of interactive streaming applications and client applications. The SDK provides Application Programming Interfaces (APIs) that connect devices directly to an application. It captures and encodes audio and video, streams content across the Internet in near real-time, decodes content on client devices, and returns user input to the application.

AMAZON® has built their AppStream SDK in a native C programming language. It provides C header files and libraries that provide the functionality needed to stream an application from AMAZON® AppStream as well as receive the streamed content from the server application in a client application.

The AppStream SDK currently limits software developers to using the C language for new development or forces design challenges when utilizing other programming languages such as Microsoft C#.NET or VB.NET. When designing applications that have a graphically intensive user interface like games, it is often necessary to use a low level programming language to better manage device resources and increase performance. The SDK provides methods for creating server applications and lightweight client applications that work in conjunction with one another. For an application to function properly, it is necessary to have a server application and a client application communicating where the client application interacts with the video and audio stream that is being streamed from a server application.

The AWS AppStream application provisioning methods are extremely laborious and time intensive. It requires an in-depth knowledge of cloud computing and specific knowledge of AMAZON®'s AWS platform to provision an account for streaming applications from AWS. The learning curve is very large for an average developer when committing to streaming their application using AMAZON®'s AppStream. A heavy burden lies with either IT personnel or software developers to get applications streaming on AWS utilizing a non-intuitive web interface.

One major obstacle that currently exists with the AMAZON®'s AppStream concept is the fact that there is no built-in automation for provisioning a single or multiple applications to the AWS cloud. A second major obstacle with AMAZON® AppStream is that there are no Integrated Development Environment templates or plug-ins to assist a developer with rapid application development. A third major obstacle revolves around the requirement for the use of Java wrappers within the SDK when connecting to an entitlement service. A template for other programming languages currently does not exist within the AMAZON® AppStream SDK that provides connectivity the REST API of the AMAZON® AppStream service.

Present Invention Solution

Figure 8:
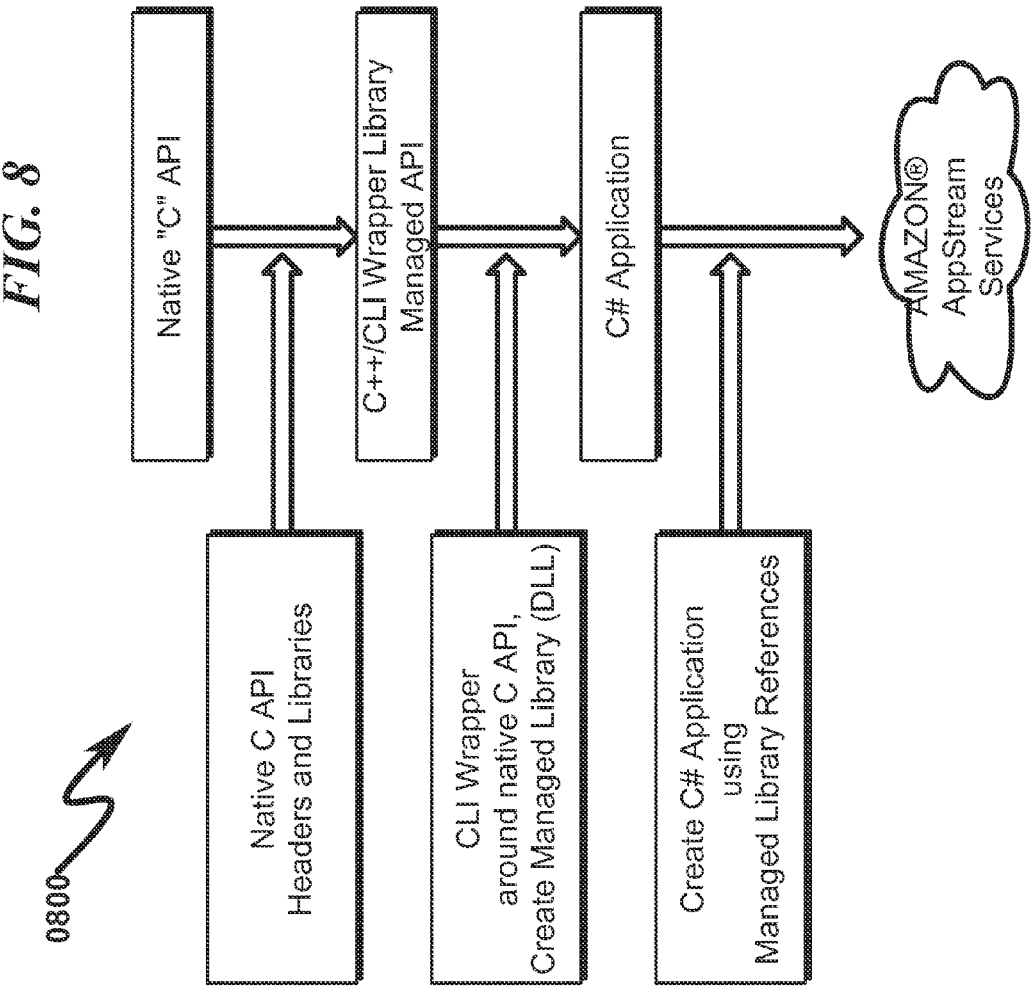
FIG. 8 illustrates an exemplary invention embodiment as applied to AMAZON® APPSTREAM SERVICES.

To bridge the gap between AMAZON®'s AppStream native C API's and the .NET Framework for application development, the present invention in some preferred embodiments as depicted in FIG. 8 (0800) builds a wrapper that provides interface access to AppStream API resources from within another programming language such as C# or VB. The wrapper includes interfaces from the native C environment to a Microsoft .NET managed environment using a C++/CLI wrapping technique creating a managed dynamically linked library that may be used as a reference from within a C# application. In addition to the C++/CLI library, a visual studio plug-in is designed and developed to provide .NET desktop application developers a set of tools, templates and a framework to automate the building of a streaming application using the Microsoft .NET Framework. This will increase productivity and reduce the amount of time in a development lifecycle.

To bridge the gap between AppStream application development and provisioning an AppStream application in the AWS cloud, automation is implemented in this invention embodiment. Automation is implemented using web service connections to the AMAZON® Web Services platform from within a control application that shares information within an integrated development environment.

AMAZON®'s AppStream application provisioning currently requires that an application use a single executable (.exe) file that does not require user interaction that is installed on an AMAZON® EC2 instance in silent or unattended mode. Part of the automation may occur within the setup routines that allow information to be shared with the auto provisioning application that will allow a developer to design a streaming application, create an appropriate installer, and build the provisioning connections.

AMAZON® AppStream application provisioning currently requires a software developer to build an entitlement service for authentication. An entitlement service authenticates and authorizes users between a light weight client and an AppStream server application, ensuring that only those clients entitled to access the application do so. The entitlement service can authenticate users in a variety of ways:
 by comparing user login credentials to a list of subscribers in a database,
 by using an external login service, or
 by authenticating all clients.

The current AppStream SDK only contains Java wrappers for the (Representational State Transfer) REST API of the AMAZON® AppStream service. The wrapper classes handle the overhead of signing requests to the REST API and provide functions that an entitlement service can call in order to create new client sessions.

To bridge the gap between the AppStream application and authentication, an entitlement service is automated within an Integrated Development Environment such that it will expose a template that can be utilized with an AppStream application. The entitlement service sends HTTP requests directly to the AMAZON® AppStream REST API using a .NET Framework programming language.

Exemplary N-Multicore CPU Embodiment (0900)-(1200)

Figure 9:
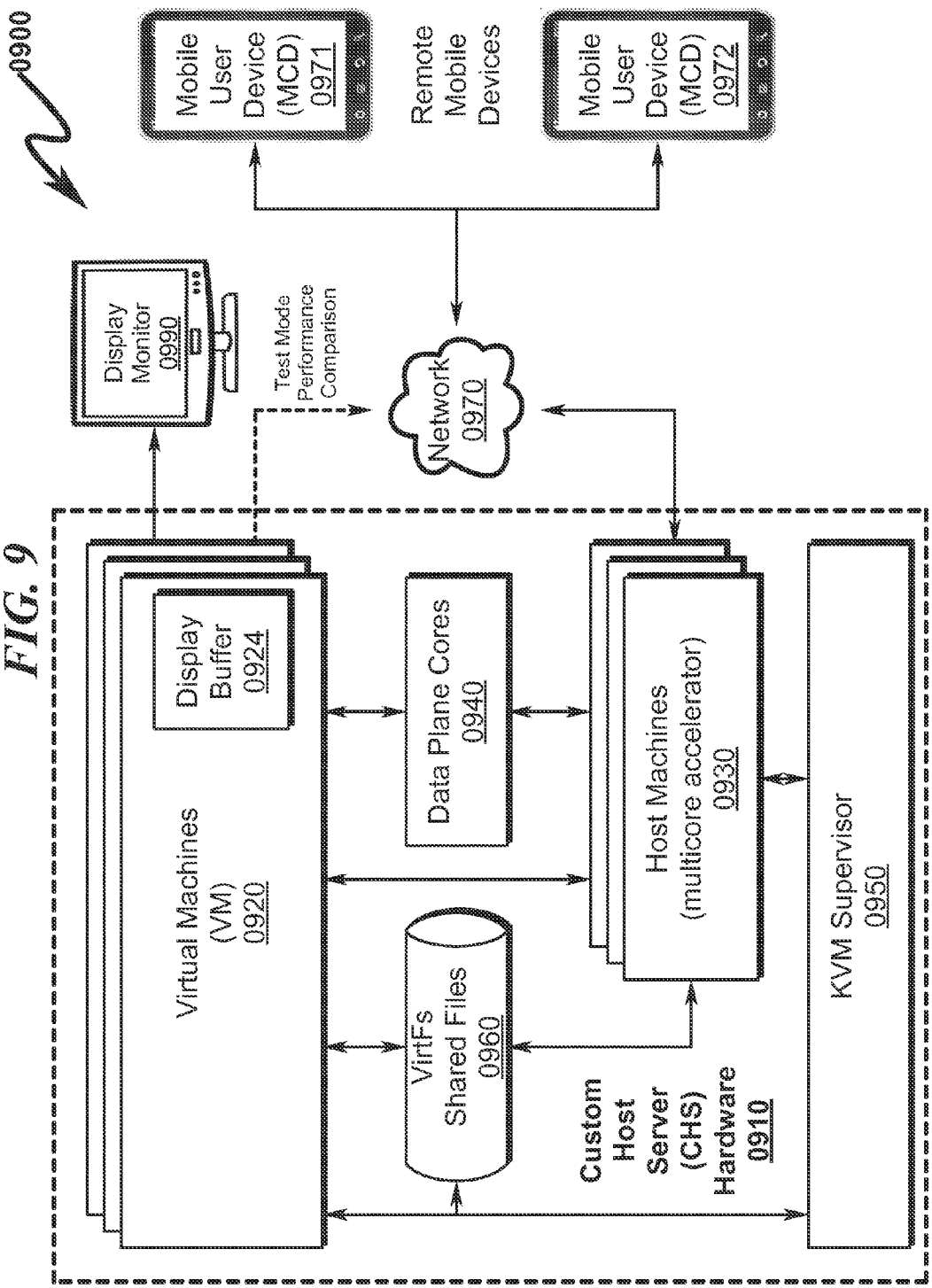
FIG. 9 illustrates an overview system block diagram of a presently preferred invention system embodiment employing a custom host server (CHS) hardware platform incorporating multicore processors.

An exemplary N-multicore CPU embodiment of the present invention is depicted in FIG. 9 (0900)-FIG. 12 (1200) and will now be discussed in more detail.

Server Cores and Data Plane Cores not Limitive

The present invention anticipates a wide variety of server CPU cores and Data Plane cores may be used in this disclosed embodiment, including x86 (Intel) and ARM.

Multicore Accelerator Cores not Limitive

The present invention anticipates a wide variety of multicore accelerator cores, including compute intensive, GPU (Graphics Processing Unit) neural network, packet processing, and other types, may be used in this disclosed embodiment. Examples of manufacturers of these cores include Intel, Texas Instruments, Nvidia, Freescale, ARM, and others.

General Concepts, Definitions, and Advantages

This present invention embodiment combines customized hardware (in the form of suitable low SWaP multicore accelerator expansion cards) that are configured into customized compute servers, including:
 host operating system (such as Linux);
 hypervisor (such as KVM, or Kernel based Virtual Machine);
 data plane cores; and
 a plurality of Virtual Machines (VMs) that run user applications.

Definitions relating to this exemplary embodiment that will be understood by those skilled in the art include:
 Data Plane Cores. Data plane cores run minimal software, without a fully formed operating system, providing a low-level, very fast interface to motherboard hardware components in the server such as PCIe and network I/O.
 Virtualization. Virtualization is the process of allowing multiple "virtual machines" (VMs) to run on one physical machine, sharing physical resources such as hard disk drive and other storage, network input/output, screen display (monitor), keyboard, mouse, etc., with each VM theoretically being unaware of other VMs. However, due to performance penalties imposed by the process of virtualization and resource sharing, VM users may surmise they are being affected by other users.
 Heterogeneous cores. The term "heterogeneous cores" refers to a variable mix of core types used together inside the HPC server. Such cores are fundamentally different (i) at the chip (semiconductor) architecture level, and (ii) at the machine instruction code level (represented to the programmers by the chip's "native" assembly language). These fundamental differences in chips (and thus all cores contained on a chip) result in substantial differences in tool chains and utilities to build executable programs (starting from source code created by the programmer). In some cases, the programming model for heterogeneous cores may also differ substantially.
 Guest. Guest is synonymous with a Virtual Machine (VM). This terminology arises from use of "host" and "guest", where host means the physical machine and its operating system running on the server.
 SWaP. SwAP means size, weight, and power consumption, and is typically used in the context of constraints, or limitations under which servers in the cloud computing or data center must operate.
 Pragma. A pragma is an element of source code that is "outside the scope" of the native programming language. Typically pragmas are used to mark "begin" and "end" of source code sections and apply a desired action or attribute to the designated source code section. The pragmas used by the present invention are pre-processed by CIM software, and ignored by native compilers.

KVM. KVM means Kernel based Virtual Machine hypervisor that supervises the virtual machines installed on the custom computer server. The KVM hypervisor runs on the physical machine and is aware of all server resource and component usage, at all levels, and at all times. Note that in the case of Data Plane cores and Accelerator cores, the KVM hypervisor is typically aware of the presence and "amount", or extent of these resources, but not of internal operation inside these resources.

API. API means Application Programming Interface, and typically refers to a series of function (or procedure) calls made available, or "exposed", to programmers by a software module such as a library, driver, or other software component.

The present invention exemplary embodiment has an approach to HPC and supercomputing in cloud computing and data centers that provides several advantages, including:

Provides substantial performance increase for virtualized servers and avoids performance penalties associated with virtualization, a process that optimizes usage of servers (allocation between users), and has become prevalent in cloud computing and data centers to reduce equipment and operating costs. Performance increases are realized for both compute intensive processing and reduce latency with increased bandwidth network input/output.

Accelerates a wide range of user software running inside Virtual machines (VMs) that host a range of operating systems (such as Linux, WINDOWS®, etc.).

Provides a simplified, easy-to-use programming interface.

Provides a uniform, consistent method of incorporating and programming a range of heterogeneous CPU cores into standard, off-the-shelf servers.

Reduces hardware costs and software licensing costs and usage fees compared to expensive, dedicated supercomputing systems.

Remote devices need not have extensive computational and network input/output resources in order to run complex, highly compute intensive applications (such as face, voice, and location recognition) and personal computational finance applications.

One skilled in the art will recognize that the above list of advantages is only exemplary and non-exhaustive.

Ancillary Embodiment Description (0900)

Additional detail regarding operation of a preferred invention embodiment may be found by considering a video stream data flow in FIG. 9 (0900). In this exemplary system embodiment a custom computing server enhanced for HPC and Supercomputing applications (0910) hosts a plurality of VMs (0920), each running independent user applications with dedicated user display buffers (0924) (i.e. one display per user). The HPC server (0910), enhanced with a plurality of multicore accelerators (0930), and performing Background Acceleration as described herein, captures each VM display buffer video output (0924), encodes and compresses the display video content for efficient network transmission, and streams the compressed output to remote devices, allowing each VM user to view, control, and otherwise run their applications remotely. From a server efficiency perspective, the ability to host multiple users concurrently demonstrates the performance benefit of this invention embodiment.

In another preferred invention embodiment, additional detail may be found by considering a modification of the video stream data flow in FIG. 9 (0900). In this case video input streams are received from a plurality of remote devices (0971, 0972), and processed by one or more VMs (0920) executing image analytics and image processing algorithm programs, which are accelerated on the multicore accelerator (0930). Results such as face recognition or location recognition are then streamed back to remote device users. This invention embodiment demonstrates a great benefit to users of mobile devices, which lack sufficient computational resources and power sources to perform complex algorithms and processing required by artificial intelligence applications of image analytics.

System Description Detail (1000)-(1200)

Figure 10:
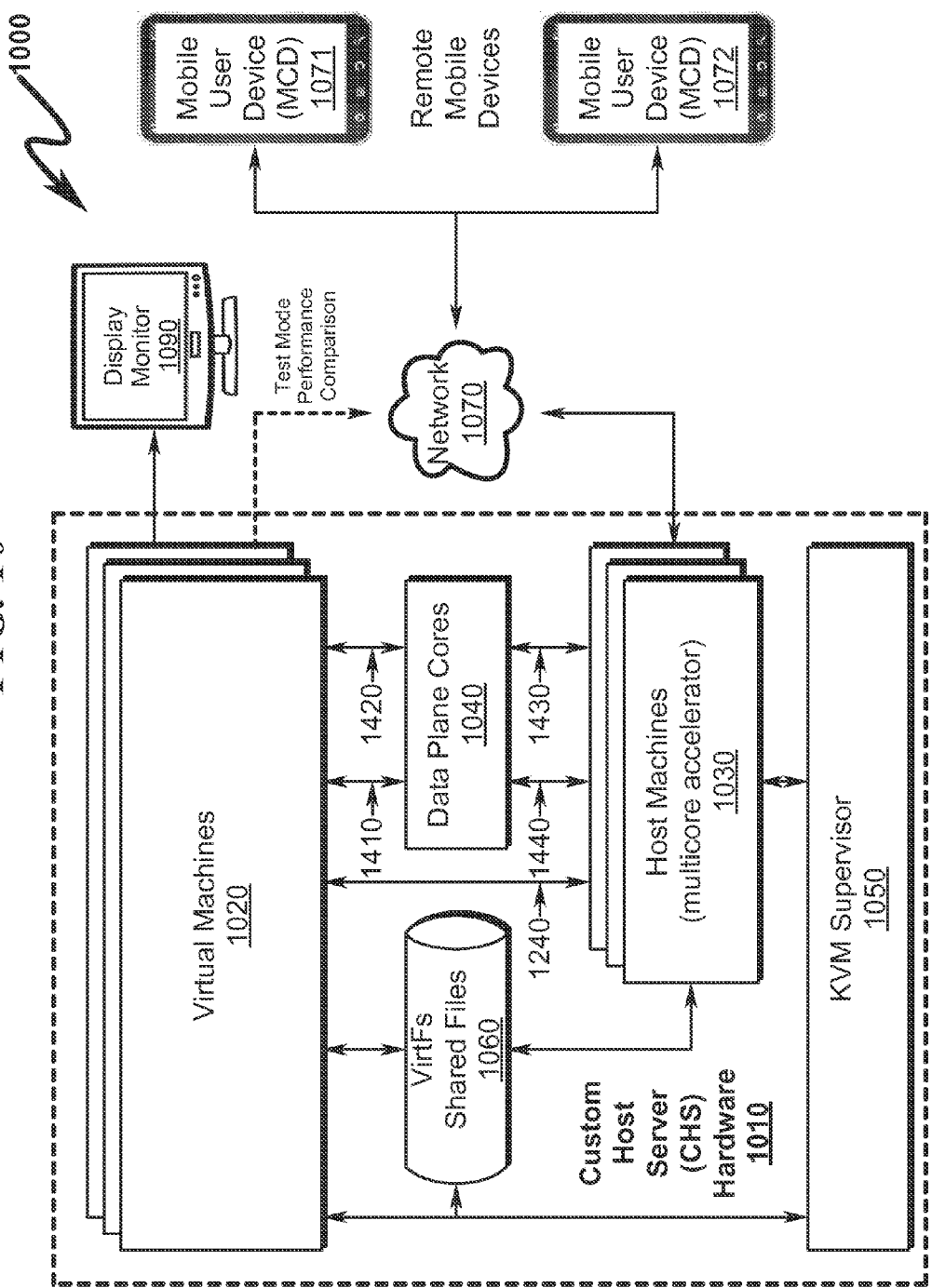
FIG. 10 illustrates an overview system block diagram of a presently preferred invention system embodiment employing a custom host server (CHS) hardware platform incorporating multicore processors illustrating overall data flows.

The general invention concept may be better understood by inspecting the system overview block diagram depicted in FIG. 10 (1000). In this exemplary system embodiment, a custom host server (CHS) (1010) contains a plurality of virtual machines (VMs) (1020), a host Linux machine (1030), a plurality of data plane cores (1040), a KVM (Kernel based Virtual Machine) hypervisor (1050), and a VM-host shared file system (1060).

Figure 11:
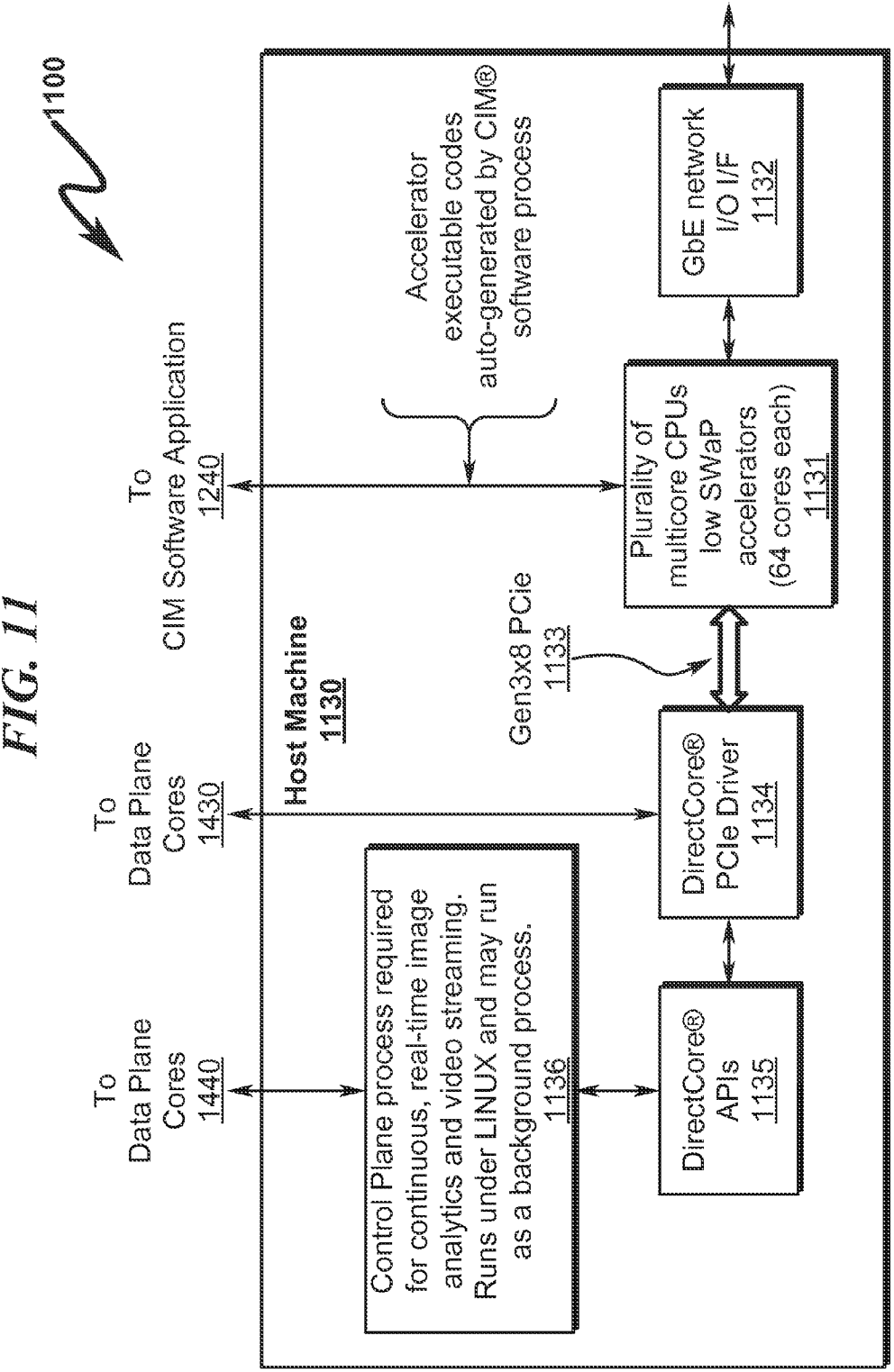
FIG. 11 illustrates a detail system block diagram of a presently preferred invention system embodiment employing host machines incorporating multicore processors.

The host machines (1030) depicted in FIG. 10 (1000) are described in further detail in FIG. 11 (1100) and contain a plurality of multicore CPU accelerators (1131) connected via gigabit Ethernet (1132) and PCIE bus (1133), a DIRECTCORE® driver (1134), DIRECTCORE® API library (1135), and a control plane process (1136).

Figure 12:
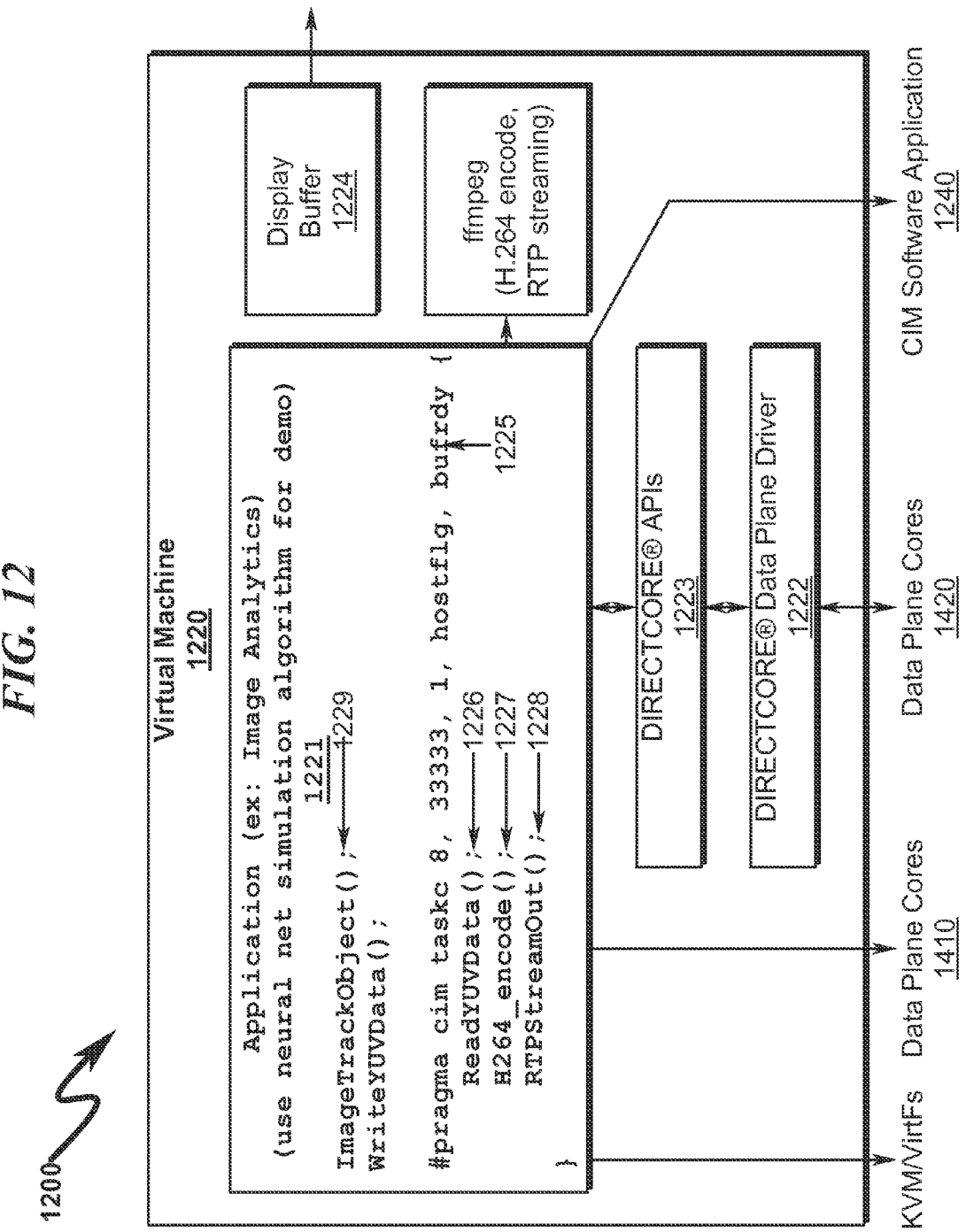
FIG. 12 illustrates a detail system block diagram of a presently preferred invention system embodiment employing virtual machines incorporating control and dispatch to multicore parallel processors.

The virtual machines (1020) as depicted in FIG. 10 (1000) are further detailed in FIG. 12 (1200) and contain one or more applications (1221) such as the image analytics example (1221) shown in FIG. 12 (1200), and a DIRECTCORE® driver (1222) and DIRECTCORE® API library (1223).

The present invention allows numerous performance benefits to Virtual Machines (VMs) (1220), stemming from hardware enhancement of the custom server hardware using multicore accelerators (1131). The present invention provides two (2) types of acceleration for the VMs: (i) automated "VM Background Acceleration", for example capture and streaming of VM screen (display) video output to remote devices, and (ii) "VM Foreground Acceleration", by offloading specific program sections, expressed at the source code level such as (1225) and containing compute intensive functions (1226 thru 1229), to the multicore accelerator (1131).

VM Background Acceleration is accomplished by the following sequence:

The Control Plane process (1136) directly issues (1440) commands and instructions to Data Plane cores ("Data Plane commands"). Data Plane commands include (i) which VMs to operate on and which multicore accelerator (1131) cores to associate with each VM, (ii) what type of operations to perform, and (iii) memory addresses to use for both VM memory areas and multicore accelerator memory areas. In coordination with the Data Plane commands it issues, the Control Plane process (1136) also issues commands and instructions ("Control Plane commands" (1430) to the multicore accelerator (1131), using DIRECTCORE® API calls (1135) and the DIRECTCORE® PCIe Driver (1134). Control Plane commands issued to the multicore accelerator (1131) include (i) parameters for compute-intensive programming and high performance, low latency network input/output, (ii) rate and timing information required for real-time operation, and (iii) information about remote device and computer endpoints (such as their network address).

Data Plane cores (1040), running non-Linux, low-level software and guided by commands issued by the Control Plane process (1136), directly read (1410) data from memory areas of a plurality of VMs, such data including but not limited to screen (display) output, data base storage, and data analytics results.

Data Plane cores, using the DIRECTCORE® PCIe Driver (1135), transfer VM data to the multicore accelerator (1131) for compute intensive processing and network communication (1132).

The multicore accelerator (1131) performs compute intensive processing and high performance, low-latency network input/output (1132) to provide performance benefits to a plurality of VMs. The multicore accelerator (i) follows commands and instructions provided by the Control Plane process (1136) to dynamically allocate a varying number of cores to each VM, (ii) runs pre-defined executable programs, according to commands issued by the Control Plane process, in order to perform compute intensive processing on a plurality of CPU cores using a self-contained real-time operating system, memory shared between cores, memory specific to each core, and large amounts of external memory available to each CPU, and (iii) uses its self-contained network interface (1132), to transfer data to/from remote devices and other computers addressable through the public network (1070).

VM Foreground Acceleration occurs when a VM runs a program that has been annotated by the programmer to target certain sections of the program for acceleration, and is accomplished by the following sequence [ref VM Foreground Acceleration flowchart]:

A programmer uses CIM® pragmas (1225) to annotate source code sections of the program for acceleration. Source code within pragmas typically includes, but is not limited to, compute intensive processing and network I/O communication.

The CIM software process (1240) automatically parses and interprets programmer-inserted pragmas and generates independent source code streams for program sections that should continue to run on the VM and sections that should run outside the VM on the multicore accelerator (1131), thus enjoying a performance benefit and avoiding performance penalties incurred by the VM, as noted above The CIM software process augments the generated source code streams with required DIRECTCORE® API calls for data transfer, shared memory, synchronization between program sections, and load, initialization, and execution of all program sections at run-time.

The CIM software process (1240) automatically "builds" (compiles, assembles, and links) executables for the VM and for the multicore accelerator (1131).

At run-time, VM executable programs use DIRECTCORE® API calls to transfer data and commands through the DIRECTCORE® Data Plane Driver (1222), Data Plane cores (1040), and DIRECTCORE® PCIe Driver (1134), in order to communicate and synchronize with multicore accelerator (1131) program sections as needed.

The multicore accelerator (1131) performs compute intensive processing and high performance, low-latency network I/O (1132) to provide performance benefits to a plurality of VMs. The multicore accelerator (i) follows commands and instructions issued by the Control Plane process (1136) to dynamically allocate a varying number of cores to each VM, (ii) runs pre-defined and previously built executable programs to perform compute intensive processing on a plurality of CPU cores using a self-contained real-time operating system, memory shared between cores, memory specific to each core, and large amounts of external memory available to each CPU, and (iii) uses its self-contained network interface (1132), to transfer data to/from remote devices and other computers addressable through the public network (1070).

In addition to communication between VMs (1020) and the multicore accelerator (1131), the Control Plane process (1136) may also issue commands and instructions to the multicore accelerator (1131) during run-time operation, using DIRECTCORE® API calls (1135) and the DIRECTCORE® PCIe Driver (1134). Control Plane commands issued to the multicore accelerator (1131) include, but are not limited to, (i) parameters for compute-intensive programming and high performance, low latency network input/output (1132), (ii) rate and timing information required for real-time operation, and (iii) information about remote device and computer endpoints (such as their network address). This information may be in addition to information communicated between VM executable programs and the multicore accelerator (1131).

For both Background Acceleration and Foreground Acceleration, the Control Plane process (1136) continuously monitors and gathers statistics about multicore accelerator (1131) core usage, network I/O usage, and memory usage, in order to efficiently determine VM-to-core mapping (cores on the multicore accelerator), optimize performance, and prevent "overbooking" situations when multiple VMs are accelerated.

Examples of Control Plane command applications include:

Signaling for telecom applications, sometimes referred to as "session setup" and "session tear-down" (for voice/speech/voice-over-IP applications, this is typically referred to as "call setup" and "call tear-down").

Command and control for distributed data analytics applications, for instance applying the Hadoop algorithm to allow multicore accelerator (1131) CPUs to operate as independent Hadoop processing nodes.

Command control for remote desktop video streaming, for instance level of compression, latency, video quality, and other parameters affecting the remote user experience.

In a nominal off-the-shelf commodity server, with size of "1 U" (about 1.8 inches height, 19-inch width, and 30-inch depth), up to eight (8) 64-core multicore accelerators (1131) can be installed, which would provide 512 compute intensive cores. This is in addition to a number of native cores allocated to the custom server host machine (1030) and virtual machines (1020). This configuration contrasts to a typical off-the-shelf server might contain from eight (8) to thirty-two (32) native cores, all of the same type, such as Intel ×86 cores or ARM cores, in which an additional 512 compute intensive cores represents a substantial increase in cores. For off-the-shelf servers with sizes of "2 U", "3 U", "5 U", etc., even more multicore accelerators may be added, resulting in servers with more thousands of cores.

Multicore accelerators (1131) in the form of PCIe expansion cards may be configured to "drop in" to the PCIe expansion slots available in properly configured server backplanes. Various such cards may be configured using this design approach, containing compute intensive and other types of cores made by semiconductor manufacturers such as Intel, Nvidia, Texas Instruments, Octasic, Freescale, and others. It is desirable for the multicore accelerator to be of "single slot thickness" to economize on space usage, and operate without excessive power consumption, in order to avoid generating excessive heat which may affect the server manufacturer's warranty and mean-time-between-failure specifications.

Note that this approach to application virtualization in deployment is also efficient with respect to software installation and maintenance in that the HPC server (1010) acts as a central repository for all software to be deployed and run by remote mobile device users. Additionally licensing cost or usage fees for the software contained in the HPC server (1010) may be calculated based on number of simultaneous users rather than on a per server basis.

System Summary

The present invention system anticipates a wide variety of variations in the basic theme of construction, but can be generalized as a cloud computing system comprising:
  (a) host computer system (HCS);
  (b) mobile computing device (MCD); and
  (c) computer communication network (CCN);
  wherein
    the HCS is configured to execute host operating system software (HOS) machine instructions read from a computer readable medium;
    the HOS further comprises virtualized graphical user interface (VUI) device driver machine instructions read from a computer readable medium;
    the VUI is configured to virtualize the graphical user experience (GEX) and user input experience (UEX) associated with host application software (HAS) executed on the HCS;
    the VUI is configured to translate the GEX into a remote video stream (RVS);
    the HCS is configured to transmit the RVS to the MCD over the CCN;
    the MCD further comprises a thin client application (TCA) further comprising machine instructions implementing a graphics experience mapper (GEM) and user experience mapper (UEM);
    the GEM is configured to receive the RVS and present the RVS to a display on the MCD;
    the UEM is configured to accept user input data (UID) entered on the MCD and translate the UID to an equivalent UEX protocol; and
    the TCA is configured to transmit the equivalent UEX protocol to the VUI for presentation to the HAS through the HCS.

This general system summary may be augmented by the various elements described herein to produce a wide variety of invention embodiments consistent with this overall design description.

Method Summary

The present invention method anticipates a wide variety of variations in the basic theme of implementation, but can be generalized as a CLOUD COMPUTING method wherein the method is performed on a CLOUD COMPUTING system comprising:
  (a) host computer system (HCS);
  (b) mobile computing device (MCD); and
  (c) computer communication network (CCN);
  wherein
    the HCS is configured to execute host operating system software (HOS) machine instructions read from a computer readable medium;
    the HOS further comprises virtualized graphical user interface (VUI) device driver machine instructions read from a computer readable medium;
    the VUI is configured to virtualize the graphical user experience (GEX) and user input experience (UEX) associated with host application software (HAS) executed on the HCS;
    the VUI is configured to translate the GEX into a remote video stream (RVS);
    the HCS is configured to transmit the RVS to the MCD over the CCN;
    the MCD further comprises a thin client application (TCA) further comprising machine instructions implementing a graphics experience mapper (GEM) and user experience mapper (UEM);
    the GEM is configured to receive the RVS and present the RVS to a display on the MCD;
    the UEM is configured to accept user input data (UID) entered on the MCD and translate the UID to an equivalent UEX protocol; and
    the TCA is configured to transmit the equivalent UEX protocol to the VUI for presentation to the HAS through the HCS;
  wherein the method comprises the steps of:
    (1) with the HCS, virtualizing the display output for the HAS to generate the GEX;
    (2) with said HCS, converting said GEX to the RVS in real-time;
    (3) with the HCS, transmitting the RVS to the MCD over the CCN;
    (4) with the MCD, translating the RVS into a visual display presented on the MCD;
    (5) with the MCD, asynchronously obtaining the UID from the MCD;
    (6) with the MCD, translating the UID into a compatible UEX protocol;
    (7) with the MCD, transmitting the translated UID to the VUI UEX processor on the HCS; and
    (8) with the HCS, emulating API message protocols for user input devices on the HCS using the translated UID as the emulator source input.

This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:
  An embodiment wherein the CCN comprises the Internet.
  An embodiment wherein the HOS comprises a MICROSOFT® WINDOWS® operating system.
  An embodiment wherein the MCD is selected from a group consisting of: smartphone; IPHONE®; cellular phone; computer tablet; IPAD®; laptop; and desktop computer.
  An embodiment wherein the VUI comprises machine instructions implementing AMAZON® AppStream STX Protocol.
  An embodiment wherein the RVS comprises a compressed video communication (CVC) format selected from a group consisting of: MPEG; MPEG-2; MPEG-4; H.264; THEORA; WEBM; DIRAC; REALVIDEO; VP8; and HEVC.

An embodiment wherein the RVS comprises a compressed audio/video communication (CVC) format selected from a group consisting of: MPEG; MPEG-2; MPEG-4; H.264; THEORA; WEBM; DIRAC; REALVIDEO; VP8; and HEVC.

An embodiment wherein the GEX is implemented as a virtual video display device driver configured to translate user display output from the HAS directly to the RVS.

An embodiment wherein the UEM is configured to translate hand gestures entered as the UID into equivalent UEX protocols.

An embodiment wherein the UEM is configured to translate the UID into equivalent UEX protocols that comprise mouse input commands.

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., hard disks and USB thumb drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A system and method deploying cloud computing software applications and resources to mobile devices has been disclosed. The system/method virtualizes the graphical user experience (GEX) and user input experience (UEX) that comprise the graphical user interface (GUI) for host application software (HAS) running on a host computer system (HCS). The virtualized GUI (VUI) GEX component is converted to a remote video stream (RVS) and communicated to a remote mobile computing device (MCD) over a computer communication network (CCN). A MCD thin client application (TCA) receives the RVS and presents this GEX content on the MCD display using a graphics experience mapper (GEM). A TCA user experience mapper (UEM) translates MCD user inputs to a form suitable for UEX protocols and communicates this user input over the CCN to the HCS for translation by the UEX into HCS operating system protocols compatible with the HAS.

What is claimed is:

1. A cloud computing system comprising:
   (a) host computer system (HCS);
   (b) mobile computing device (MCD); and
   (c) computer communication network (CCN);
   wherein
   said HCS is configured to execute host operating system software (HOS) machine instructions read from a computer readable storage;
   said HOS further comprises virtualized graphical user interface (VUI) device driver machine instructions read from a computer readable storage;
   said VUI is configured to virtualize the graphical user experience (GEX) and user input experience (UEX) associated with host application software (HAS) executed on said HCS;
   said VUI is configured to translate said GEX into a remote video stream (RVS);
   said HCS is configured to transmit said RVS to said MCD over said CCN;
   said MCD further comprises a thin client application (TCA) further comprising machine instructions implementing a graphics experience mapper (GEM) and user experience mapper (UEM);
   said GEM is configured to receive said RVS and present said RVS to a display on said MCD;
   said UEM is configured to accept user input data (UID) entered on said MCD and translate said UID to an equivalent UEX protocol; and
   said TCA is configured to transmit said equivalent UEX protocol to said VUI for presentation to said HAS through said HCS.

2. The cloud computing system of claim 1 wherein said CCN comprises the Internet.

3. The cloud computing system of claim 1 wherein said HOS comprises a MICROSOFT WINDOWS operating system.

4. The cloud computing system of claim 1 wherein said MCD is selected from a group consisting of: smartphone; IPHONE; cellular phone; computer tablet; IPAD; laptop; and desktop computer.

5. The cloud computing system of claim 1 wherein said VUI comprises machine instructions implementing AMAZON AppStream STX Protocol.

6. The cloud computing system of claim 1 wherein said RVS comprises a compressed video communication (CVC) format selected from a group consisting of: MPEG; MPEG-2; MPEG-4; H.264; THEORA; WEBM; DIRAC; REALVIDEO; VP8; and HEVC.

7. The cloud computing system of claim 1 wherein said RVS comprises a compressed audio/video communication (CVC) format selected from a group consisting of: MPEG; MPEG-2; MPEG-4; H.264; THEORA; WEBM; DIRAC; REALVIDEO; VP8; and HEVC.

8. The cloud computing system of claim 1 wherein said GEX is implemented as a virtual video display device driver configured to translate user display output from said HAS directly to said RVS.

9. The cloud computing system of claim 1 wherein said UEM is configured to translate hand gestures entered as said UID into equivalent UEX protocols.

10. The cloud computing system of claim 1 wherein said UEM is configured to translate said UID into equivalent UEX protocols that comprise mouse input commands.

11. A cloud computing method configured to operate on a cloud computing system comprising:
 (a) host computer system (HCS);
 (b) mobile computing device (MCD); and
 (c) computer communication network (CCN);
 wherein
  said HCS is configured to execute host operating system software (HOS) machine instructions read from a computer readable storage;
  said HOS further comprises virtualized graphical user interface (VUI) device driver machine instructions read from a computer readable storage;
  said VUI is configured to virtualize the graphical user experience (GEX) and user input experience (UEX) associated with host application software (HAS) executed on said HCS;
  said VUI is configured to translate said GEX into a remote video stream (RVS);
  said HCS is configured to transmit said RVS to said MCD over said CCN;
  said MCD further comprises a thin client application (TCA) further comprising machine instructions implementing a graphics experience mapper (GEM) and user experience mapper (UEM);
  said GEM is configured to receive said RVS and present said RVS to a display on said MCD;
  said UEM is configured to accept user input data (UID) entered on said MCD and translate said UID to an equivalent UEX protocol; and
  said TCA is configured to transmit said equivalent UEX protocol to said VUI for presentation to said HAS through said HCS;
 wherein said method comprises the steps of:
  (1) with said HCS, virtualizing the display output for said HAS to generate said GEX;
  (2) with said HCS, converting said GEX to said RVS in real-time;
  (3) with said HCS, transmitting said RVS to said MCD over said CCN;
  (4) with said MCD, translating said RVS into a visual display presented on said MCD;
  (5) with said MCD, asynchronously obtaining said UID from said MCD;
  (6) with said MCD, translating said UID into a compatible UEX protocol;
  (7) with said MCD, transmitting said translated UID to said VUI UEX processor on said HCS; and
  (8) with said HCS, emulating API message protocols for user input devices on said HCS using said translated UID as the emulator source input.

12. The cloud computing method of claim 11 wherein said CCN comprises the Internet.

13. The cloud computing method of claim 11 wherein said HOS comprises a MICROSOFT WINDOWS operating method.

14. The cloud computing method of claim 11 wherein said MCD is selected from a group consisting of: smartphone; IPHONE; cellular phone; computer tablet; IPAD; laptop; and desktop computer.

15. The cloud computing method of claim 11 wherein said VUI comprises machine instructions implementing AMAZON AppStream STX Protocol.

16. The cloud computing method of claim 11 wherein said RVS comprises a compressed video communication (CVC) format selected from a group consisting of: MPEG; MPEG-2; MPEG-4; H.264; THEORA; WEBM; DIRAC; REALVIDEO; VP8; and HEVC.

17. The cloud computing method of claim 11 wherein said RVS comprises a compressed audio/video communication (CVC) format selected from a group consisting of: MPEG; MPEG-2; MPEG-4; H.264; THEORA; WEBM; DIRAC; REALVIDEO; VP8; and HEVC.

18. The cloud computing method of claim 11 wherein said GEX is implemented as a virtual video display device driver configured to translate user display output from said HAS directly to said RVS.

19. The cloud computing method of claim 11 wherein said UEM is configured to translate hand gestures entered as said UID into equivalent UEX protocols.

20. The cloud computing method of claim 11 wherein said UEM is configured to translate said UID into equivalent UEX protocols that comprise mouse input commands.

21. A tangible non-transitory computer usable medium having computer-readable program code means comprising a cloud computing method configured to operate on cloud computing system comprising:
 (a) host computer system (HCS);
 (b) mobile computing device (MCD); and
 (c) computer communication network (CCN);
 wherein
  said HCS is configured to execute host operating system software (HOS) machine instructions read from a computer readable storage;
  said HOS further comprises virtualized graphical user interface (VUI) device driver machine instructions read from a computer readable storage;
  said VUI is configured to virtualize the graphical user experience (GEX) and user input experience (UEX) associated with host application software (HAS) executed on said HCS;
  said VUI is configured to translate said GEX into a remote video stream (RVS);
  said HCS is configured to transmit said RVS to said MCD over said CCN;
  said MCD further comprises a thin client application (TCA) further comprising machine instructions implementing a graphics experience mapper (GEM) and user experience mapper (UEM);
  said GEM is configured to receive said RVS and present said RVS to a display on said MCD;
  said UEM is configured to accept user input data (UID) entered on said MCD and translate said UID to an equivalent UEX protocol; and
  said TCA is configured to transmit said equivalent UEX protocol to said VUI for presentation to said HAS through said HCS;
 wherein said method comprises the steps of:
  (1) with said HCS, virtualizing the display output for said HAS to generate said GEX;
  (2) with said HCS, converting said GEX to said RVS in real-time;
  (3) with said HCS, transmitting said RVS to said MCD over said CCN;
  (4) with said MCD, translating said RVS into a visual display presented on said MCD;

(5) with said MCD, asynchronously obtaining said UID from said MCD;
(6) with said MCD, translating said UID into a compatible UEX protocol;
(7) with said MCD, transmitting said translated UID to said VUI UEX processor on said HCS; and
(8) with said HCS, emulating API message protocols for user input devices on said HCS using said translated UID as the emulator source input.

22. The computer usable medium of claim 21 wherein said CCN comprises the Internet.

23. The computer usable medium of claim 21 wherein said HOS comprises a MICROSOFT WINDOWS operating system.

24. The computer usable medium of claim 21 wherein said MCD is selected from a group consisting of: smartphone; IPHONE; cellular phone; computer tablet; IPAD; laptop; and desktop computer.

25. The computer usable medium of claim 21 wherein said VUI comprises machine instructions implementing AMAZON AppStream STX Protocol.

26. The computer usable medium of claim 21 wherein said RVS comprises a compressed video communication (CVC) format selected from a group consisting of: MPEG; MPEG-2; MPEG-4; H.264; THEORA; WEBM; DIRAC; REALVIDEO; VP8; and HEVC.

27. The computer usable medium of claim 21 wherein said RVS comprises a compressed audio/video communication (CVC) format selected from a group consisting of: MPEG; MPEG-2; MPEG-4; H.264; THEORA; WEBM; DIRAC; REALVIDEO; VP8; and HEVC.

28. The computer usable medium of claim 21 wherein said GEX is implemented as a virtual video display device driver configured to translate user display output from said HAS directly to said RVS.

29. The computer usable medium of claim 21 wherein said UEM is configured to translate hand gestures entered as said UID into equivalent UEX protocols.

30. The computer usable medium of claim 21 wherein said UEM is configured to translate said UID into equivalent UEX protocols that comprise mouse input commands.

* * * * *